United States Patent [19]
Wilkinson

[11] 4,321,177
[45] Mar. 23, 1982

[54] SPRAYABLE PERFLUOROALKOXY SOLUTIONS

[76] Inventor: James H. Wilkinson, 402 Poplar Ave., Williamstown, W. Va. 26187

[21] Appl. No.: 177,496

[22] Filed: Aug. 12, 1980

[51] Int. Cl.³ .................. C08L 27/18; B05D 1/02; B32B 27/00
[52] U.S. Cl. .................. 524/375; 427/421; 428/422; 524/386; 524/388; 524/544
[58] Field of Search .......... 260/29.6 F, 33.6 F; 427/421; 428/422

[56] References Cited

U.S. PATENT DOCUMENTS 2,937,156  5/1960  Berry ..................... 260/29.6 F
3,986,993  10/1976 Vassiliou ................. 260/29.6 X
4,039,497  8/1977  Troussier et al. ......... 260/29.6 F
4,147,683  4/1979  Vassiliou et al. ......... 260/33.6 X Primary Examiner—Michael R. Lusignan
Attorney, Agent, or Firm—Oldham, Oldham, Hudak & Weber Co.

[57] ABSTRACT

A composition and process for preparing a sprayable solution containing perfluoroalkoxy (PFA) resin. Components of the solution include an aromatic solvent, a binding agent, a surface active agent, and water in addition to the PFA. The solution can generally be sprayed from conventional spraying apparatus at ambient temperatures. A desired use is as a mold release agent, or as a corrosion, wear, or abrasion-resistant coating.

5 Claims, No Drawings

SPRAYABLE PERFLUOROALKOXY SOLUTIONS

TECHNICAL FIELD

The present invention relates to a sprayable solution for applying a layer of PFA resin to various articles.

BACKGROUND ART

The present invention relates to a sprayable solution for applying a layer of PFA resin to various articles.

Heretofore, PFA (perfluoroalkoxy) resin has been processed by conventional thermoplastic techniques including extrusion, injection molding, transfer molding, and blow molding. The material has also been applied electrostatically. However, heretofore, PFA resin has not been sprayable. Thus, coatings of the material could not be applied via the highly desired technique of spraying.

Fluorinated ethylene propylene copolymer (FEP), a thermoplastic having similar properties to PFA, has also been applied by conventional thermoplastic techniques such as extrusion, transfer molding, blow molding, and injection molding. Moreover, FEP is available in an aqueous dispersion and can be sprayed from spraying apparatus to form coatings on various articles. The aqueous dispersion solution of FEP contains by weight, 55 percent of water, 18 percent of xylene, 12 percent of glycerine, 8 percent of FEP, and 7 percent of a surface-treating agent, such as an alkyl phenol ethylene oxide condensate product having from 12 to 15 moles of ethylene oxide.

DISCLOSURE OF INVENTION

It is therefore an object of the present invention to provide a sprayable solution of PFA resin.

It is another object of the present invention to provide a sprayable solution of PFA resin, as above, which can be sprayed at ambient temperatures.

It is yet another object of the present invention to provide a sprayable solution of PFA resin, as above, in which thin corrosive-resistant coatings of PFA resin are applied to an article.

It is yet another object of the present invention to provide a sprayable solution of PFA resin, as above, wherein said solution is applied to a hot or heated article.

It is yet another object of the present invention to provide a sprayable solution of PFA resin, as above, to an article which is initially heated to remove the volatile materials in the solution, and subsequently baked to form a coating.

It is yet another object of the present invention to provide a sprayable solution of PFA resin, as above, in which the solution includes a binder, an aromatic solvent, a surface active agent, and water.

BEST MODE FOR CARRYING OUT THE INVENTION

According to the concepts of the present invention, a PFA resin is sprayable onto various articles. PFA (perfluoroalkoxy) is a melt processable fluoro plastic. The general chemical structure of PFA resin is

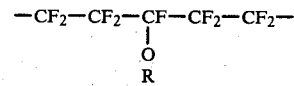

where R is $-C_nF_{2n+1}$, where n can be any natural number equal to or greater than 1, as up to 1,000 or 10,000. PFA resin generally has the ability to perform at temperature extremes similar to polytetrafluoroethylene and combines good chemical resistance with a low coefficient of friction. Its strength, hardness, and wear resistance are also similar to polytetrafluoroethylene and superior to that of fluoroethylene propylene copolymer at temperatures above 150° C. PFA is available commercially and is usually sold in pelletized grades or as a powder. Generally, the particle size is important in producing a sprayable solution and in forming a suitable film. A range of particles of from about 1 to about 100 microns is suitable, with a range of from about 1 to about 60 being preferred.

The solution is generally made by adding one of the components to another, mixing the components in a conventional manner to form a blend, as utilizing a mechanical stirrer, adding the next component, mixing it with the blend, and repeating the process until all components have so been blended.

The solution contains an aromatic solvent, for example, toluene. The amount of aromatic solvent generally ranges, based upon weight percent of the total solution, from about 5 to about 25 percent, desirably from about 10 to about 15 percent, and preferably is about 13 percent.

The binder utilized is generally a hydrocarbon resin such as glycerine, and the like. The amount by weight percent generally ranges from about 3 to about 15 percent, desirably from about 6 to about 10 percent, and preferably is approximately 9 percent.

Another component of the solution is a surface active agent, for example, the various alkyl phenol ethylene oxide condensation products containing from about 9 to about 12 or to about 15 moles of ethylene oxide. Specific examples of such surface active agents include Triton X-102, which has 12 to 13 moles of ethylene oxide, manufactured by Rohm and Haas, Triton X-100 which has 9 to 10 moles of ethylene oxide (Rohm and Haas), Triton N-111 manufactured by Rohm and Haas, Igepal Co 720 and CA 720 manufactured by GAF, T-DET N-12, and T-DET N-14 manufactured by Thompson Haward, and Surfonic N120 manufactured by Jefferson Chemical Corporation. The amount of surface active agent generally ranges from about 2 to about 13, preferably from about 5 to about 9, with a preferred amount being approximately 7.5 percent by weight.

Water is another ingredient which is utilized in the solution. The amount is generally from about 11 to about 70, preferably from about 28 to about 50, with a preferred amount being approximately 41 percent by weight.

The amount of PFA utilized generally ranges from about 10 to about 50, desirably from about 20 to about 36, and preferably is about 30 percent by weight.

The various ingredients are mixed in any conventional mixing apparatus, desirably one component added at a time to the previously mixed components as noted above. Additionally, various conventional solution agents in typical amounts can be added. Thus, various dyes, etc., can be utilized.

Once the solution has been mixed, it is sprayed through any conventional spraying apparatus upon a desired article. Thus, the sprayable PFA solution of the present invention can be added to a conventional compressed air spray gun and sprayed upon various objects. The solution generally is sprayed at ambient temperatures, that is from about 50° to about 100° F., although it can be heated and sprayed, if so desired. Additionally, the solution can be sprayed on articles having an ambient temperature or an article having surfaces above ambient, for example above 100° F., as from about 150° to about 250° F. Generally, a better coating has been found to be obtained if the article is slightly heated.

Specific areas of use generally include non-stick coating for molds, that is as a mold release agent. Other uses of the sprayed solution include application to an article wherein an article having a low coefficient is desired, wherein corrosion resistance, wear or abrasion resistance coatings are desired, or as upon platens utilized in a heat-sealing application.

Once the solution has been applied to the article, the article is generally subjected to a prebake, that is a low temperature bake to remove the volatiles, for example, the solvent and the water. The initial low temperature bake is generally achieved when the coating turns white. Although any temperature range can be utilized, a temperature of from about 150° F. to about 250° F. is desired. Naturally, the time will depend upon the thickness of the coating, the size of the coating, and the like. In the next step, that is the baking step, the coating is subjected to a high temperature bake, generally from about 600° F. to about 750° F., with about 710° F. to about 720° F. being preferred, with the time being from about 10 to about 40 minutes, with from 15 to about 30 minutes being preferred. Of course, the bake time is related to temperature and can vary greatly. The bake step vaporizes most, if not all, of the binder and causes the PFA polymer to melt flow, and to be bonded to the article. Thus, the coating or film is basically the PFA polymer containing some of the surfactant therein. Although fairly thick coatings can be produced, that is generally in excess of ½ mil, and in the range of from 1 to 2 or 4 mils, multiple coatings are often desired to build the coating thickness up to 12 mils and to ensure good corrosion resistance, a desirable film thickness, and the like. In this situation, the spraying steps, initial bake steps, and final step bakes are simply repeated a number of times until a suitable thickness is achieved, except that the preferred bake step is about 630° to about 650° F. Although the low bake step can be avoided, it is generally not since direct application of the high bake step results in an orange peel affect, that is the surface of the film having a texture such as an orange peel. The formed film or coating generally possesses the properties of PFA resin, that is it is non-stick or has a low coefficient of friction, has very good chemical resistance, good electrical properties, and other properties generally possessed by polytetrafluoroethylene.

The invention will be better understood by reference to the following example.

EXAMPLE I

The following compounds were utilized in the preparation of a sprayable PFA solution.

| COMPOUND | AMOUNT BY WEIGHT |
| --- | --- |
| Toluene | 13.3% |
| Glycerine | 8.8% |
| Triton X-102 | 7.4% |
| Water | 40.7% |
| PFA | 29.6% |

The toluene was added to a vessel having a mechanical stirrer therein. Glycerine was then added to the toluene and mixed until the compounds were totally blended. The Triton X-102 was then added to the blend and mixed until it was thoroughly blended therein. In the same manner, water was added and blended, and finally the PFA.

A portion of the formulation was added to a compressed air spraying apparatus. The spray gun was a Binks Model No. 62 using an air pressure of 30-40 psi. An aluminum mold was sprayed and then prebaked until white at 200° F. and then baked at 710°-720° F. for 15 to 20 minutes. A second coat was then applied, prebaked until white at 200° F., and then baked at 650° F. for 30 minutes. The PFA coated mold gave a 30 percent increased production rate over another mold having a silicone base resin thereon. Thus, not only was the PFA sprayable, but a superior mold release coating was produced as well.

While in accordance with the patent statutes preferred embodiments and a best mold have been described, the scope of the invention is set forth by the appended claims.

What is claimed is:

1. A sprayable perfluoroalkoxy resin solution, comprising by weight:
   from about 5 to about 25 parts of an aromatic solvent, and wherein said aromatic solvent is xylene or toluene,
   from about 3 to about 15 parts of a binding agent, and wherein said binding agent is glycerine,
   from about 2 to about 13 parts of a surface active agent, and wherein said surface active agent is an alkyl phenol ethylene oxide condensate product having from 12 to 15 moles of ethylene oxide,
   from about 11 to about 70 parts of water, and
   from about 10 to about 50 parts of a perfluoroalkoxy resin.

2. A sprayable perfluoroalkoxy resin solution according to claim 1, wherein the amount of said aromatic solvent ranges from about 10 to about 15, wherein the amount of said binding agent ranges from about 6 to about 10, wherein the amount of said surface active agent ranges from about 5 to about 9, wherein the amount of said water ranges from about 28 to about 50, wherein the amount of said perfluoroalkoxy resin ranges from about 20 to about 36, and said perfluoroalkoxy resin solution is capable of being sprayed through a spraying apparatus.

3. A sprayable perfluoroalkoxy resin solution according to claim 2, wherein said aromatic solvent is toluene, and wherein the amount of said toluene is approximately 13 percent by weight, wherein the amount of said glycerine is approximately 9 percent by weight, wherein the amount of said surface active agent is approximately 7.5 percent by weight, wherein the amount of said water is about 41 percent by weight, and wherein the amount of said perfluoroalkoxy resin is approximately 30 percent by weight.

4. A sprayable perfluoroalkoxy resin solution according to claims 3 or 4, in the form of a coating, which was applied to an article as a coating and baked at a temperature of from about 600° F. to about 750° F.

5. A sprayable perfluoroalkoxy resin solution, according to claim 4, in which said coating was prebaked at a temperature of from about 150° F. to about 250° F. before said coating was baked.

* * * * *